June 23, 1964  C. B. TRIMBLE  3,138,790
MAGNETIC STORAGE DEVICES
Original Filed April 11, 1951  3 Sheets-Sheet 1

INVENTOR
CEBERN B. TRIMBLE
BY
*Louis A. Kline*
*Albert L. Sessler, Jr.*
HIS ATTORNEYS June 23, 1964 C. B. TRIMBLE 3,138,790
MAGNETIC STORAGE DEVICES
Original Filed April 11, 1951 3 Sheets-Sheet 2
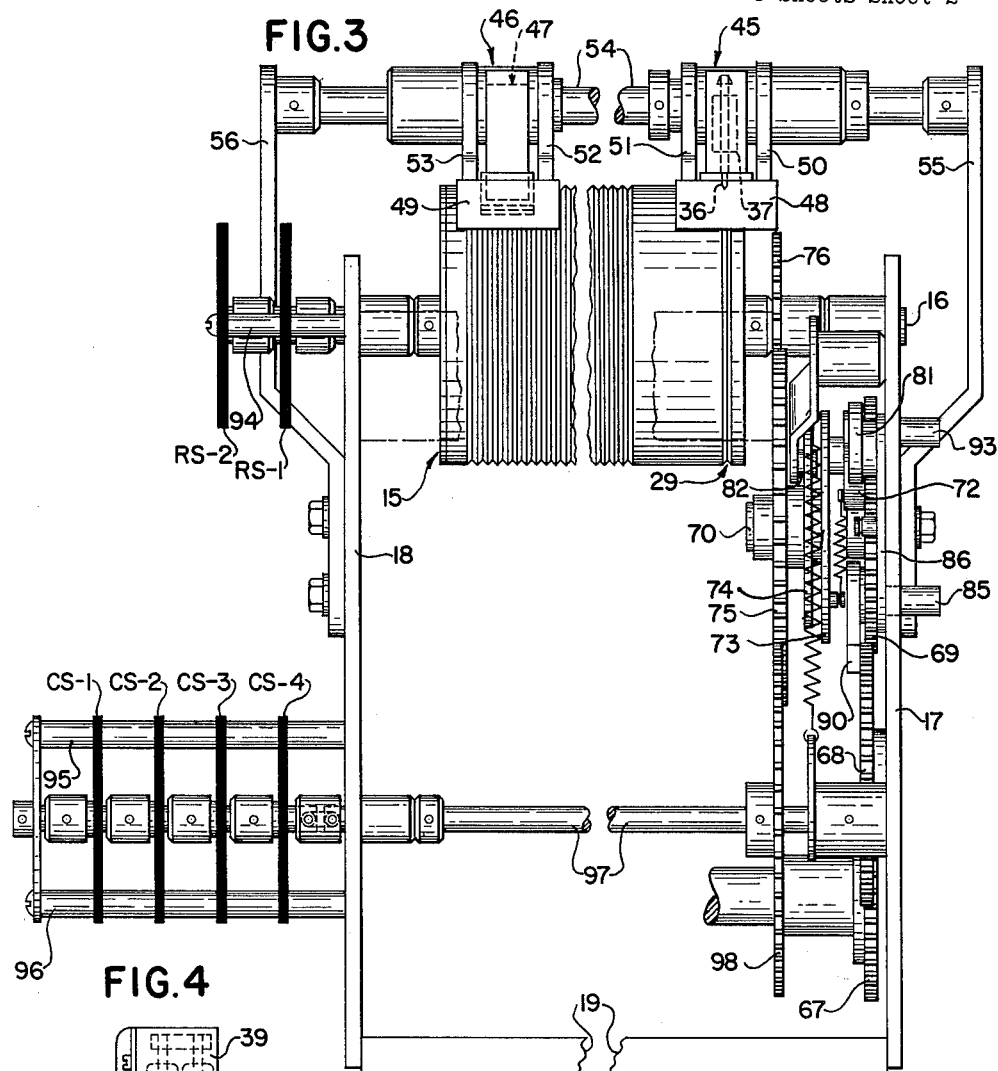
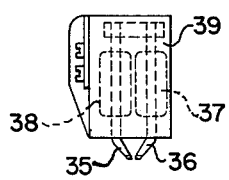
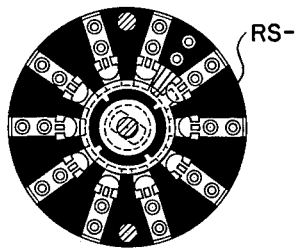
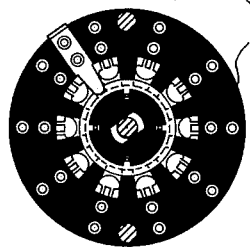
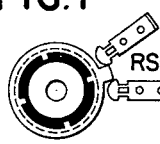
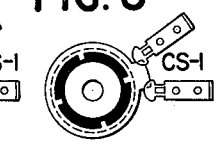
INVENTOR
CEBERN B. TRIMBLE
BY *Louis A. Kline*
*Albert L. Sessler, Jr.*
HIS ATTORNEYS June 23, 1964   C. B. TRIMBLE   3,138,790
MAGNETIC STORAGE DEVICES
Original Filed April 11, 1951   3 Sheets-Sheet 3
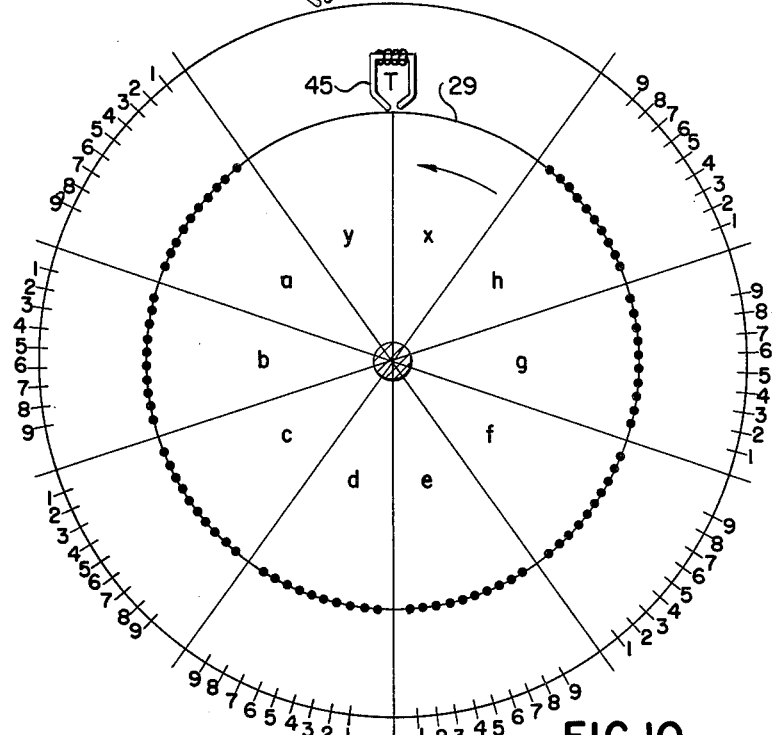
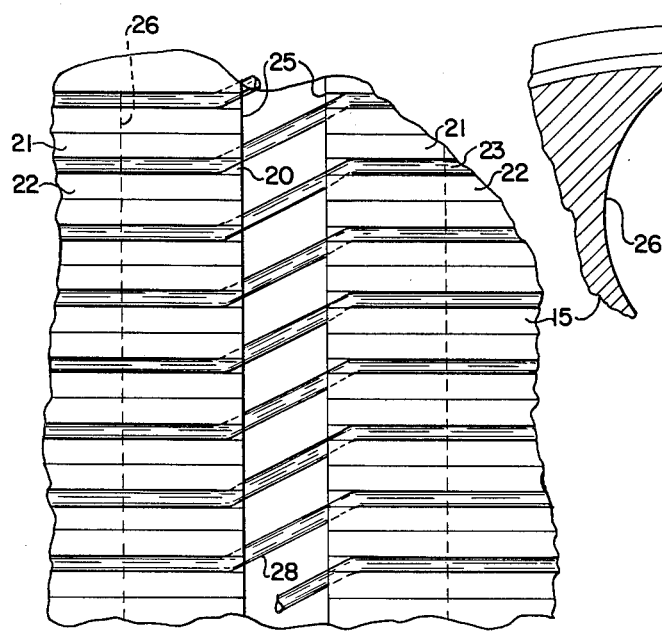
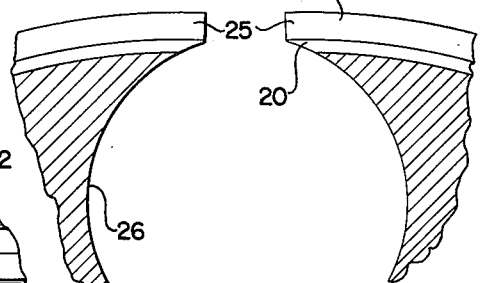
INVENTOR
CEBERN B. TRIMBLE
HIS ATTORNEYS United States Patent Office 3,138,790
Patented June 23, 1964

3,138,790
MAGNETIC STORAGE DEVICES
Cebern B. Trimble, Dayton, Ohio, assignor to The National Cash Register Company, Dayton, Ohio, a corporation of Maryland
Original application Apr. 11, 1951, Ser. No. 220,473, now Patent No. 2,931,571, dated Apr. 5, 1960. Divided and this application Oct. 23, 1959, Ser. No. 848,307
5 Claims. (Cl. 340—174.1)

This invention relates to the magnetic storage of data, and in particular to an apparatus in which a plurality of amounts can be stored in the form of discrete magnetic spots or marks and in which any desired stored amount can be withdrawn from storage, an additional amount added thereto or substracted therefrom, as desired, and the resulting amount stored in the place of the previously stored amount which was used in the particular operation.

This application is a division of United States patent application Serial No. 220,473, filed April 11, 1951, now United States Patent No. 2,931,571, issued April 5, 1960.

This invention will be explained with reference to the storage of amounts in the decimal notation, but it will be obvious from the following description that amounts in other notations and other data may be stored equally well and be withdrawn from storage and restored thereto as desired.

The apparatus constituting the preferred embodiment of the invention includes a rotatable cylinder having thereon a plurality of circumferential storage elements of magnetic material disposed longitudinally of the cylinder, each of which elements can be stored along its length, in predetermined zones or arcs about the cylinder, the various digits of an eight-denominational amount.

The apparatus is adapted to cooperate with an electronic accumulator in which amounts may be preset or set up directly under manual control and into which amounts may be entered additively from the storage elements.

A magnetic reading and recording head is provided to cooperate with any selected storage element. The reading and recording head can be controlled to operate as a reading means, so that, as the cylinder is rotated, the stored amount can be read digit by digit from the selected storage element as it passes the reading and recording head. The amount, thus read, can be entered into the proper denominational orders of the accumulator to be combined therein with other data as desired.

Further means in the apparatus are operable to read out the amount in the accumulator and to control the reading and recording head to operate as a recording means to magnetically record that amount on a storage element.

In order that a new amount may be either added to or subtracted from a stored amount, manual amount entry control means are provided which can be set to the new amount and can enter or preset the new amount in the accumulator if addition is desired and can enter or preset the complement of the new amount in the accumulator if subtraction is desired.

The novel storage means has the advantage that it is very compact and enables a large number of multi-digit amounts to be stored in a very small space; for instance, about one hundred amounts of eight denominations each can be stored on a cylinder about two and a half inches in diameter and about five inches long.

The novel apparatus has the advantage that stored amounts can be withdrawn from storage and combined with further amounts, and the resulting amounts can be stored, all in a very short time.

It is an object of the invention, therefore, to provide a compact storage means for storing a large number of multi-digit amounts in the form of magnetic representations.

A further object of the invention is to provide a novel amount storage means in which the digits of the amounts are stored in the form of corresponding numbers of discrete magnetic signals located on the storage means in proper denominational positions.

A further object of the invention is to provide a novel amount storage means from which stored amounts can readily be withdrawn and in which amounts can readily be stored.

With these and incidental objects in view, the invention includes certain novel features of construction and combinations of parts, a preferred form or embodiment of which is hereinafter described with reference to the drawings which accompany and form a part of this specification.

Of the drawings,

FIG. 3 is a front view of the apparatus of FIG. 1.

FIG. 4 is a view of a typical reading and recording head.

Figure 1:
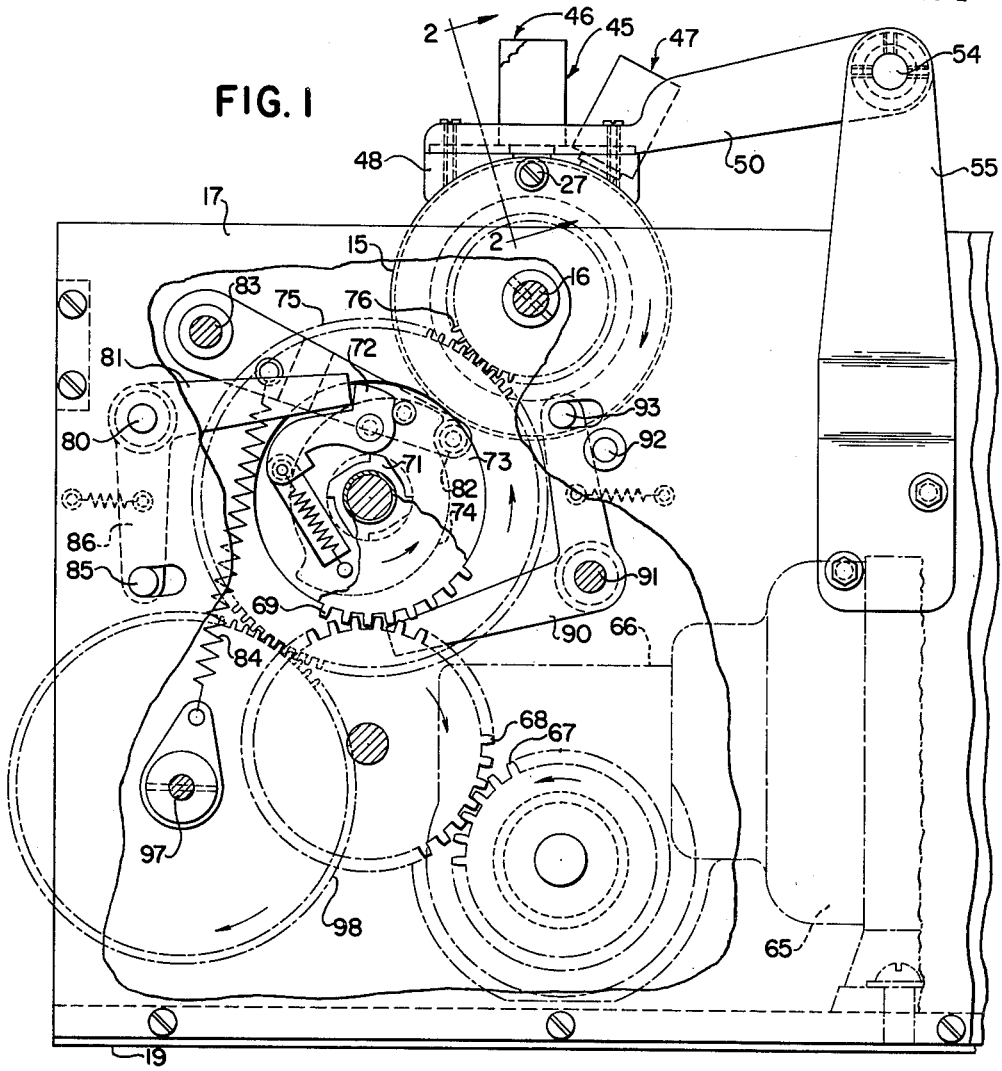
FIG. 1 is a right side elevation of the magnetic amount storage apparatus, certain parts being broken away to show other parts more clearly.

FIGS. 5, 6, 7, and 8 show details of routing and control switches in the storage apparatus.

FIG. 9 is an enlarged top plan view of a portion of the cylinder upon which the amounts are stored, showing the manner in which the storage elements are formed on the cylinder.

FIG. 10 is an enlarged sectional view of a portion of the cylinder with the storage elements omitted.

FIG. 11 provides a schematic showing of the storage elements and readout impulse generating means.

*General Description*

In general, the novel apparatus includes a storage means upon which a plurality of multi-digit amounts may be stored, means to operate the storage means during the reading of amounts therefrom and during the storage of amounts therein, and magnetic heads cooperating with the storage means to read amounts therefrom and store amounts thereon. An accumulator in which amounts can be preset or entered directly to be added to or subtracted from a stored amount, and means for enabling the accumulator to control the storage of an amount standing therein, are associated with the storage means.

In the embodiment being described to explain the invention, the storage means includes one hundred circumferential storage elements or bands of magnetic material spaced longitudinally along a rotatable supporting cylinder of non-magnetic material, each of the storage elements having a capacity for storing the digits of an eight-denominational order amount, the digits of an amount being stored in the form of a corresponding number of magnetic spots for each digit and located along the element according to their denominational position in the amount. It is to be understood that the storage means is not limited to the storage of one hundred amounts, as a larger or smaller number of storage elements may be provided, as desired, nor is it limited to the use of a separate storage element for each amount but may be formed otherwise, as by coating the cylinder with magnetizable material and allotting areas of the coated surface for the storage of amounts. Further, the apparatus having the eight-denominational-order capacity is merely illustrative and can be arranged to deal with other denominational order capacities, if desired, without departing from the invention.

In each operation of the apparatus, a driving means drives the cylinder continuously through two rotations, the first rotation of the cylinder being utilized to enable a stored amount to be read from a selected storage element and the second rotation being utilized to enable an amount to be stored on the element.

A reading and recording magnetic head and an erasing head are mounted in a movable support, so that they can be moved into cooperative relationship with any one of the storage elements of magnetic material. During the first rotation of the cylinder, the reading and recording head is controlled to perform its reading function and reads the amount from the selected element, digit by digit, as the element is moved past it, and causes the amount to be entered into an accumulator. The erasing head trails the reading and recording head and is controlled to erase the stored amount, digit by digit, from the element during the first rotation of the cylinder just after the reading and recording head has read these digits. During the second rotation of the cylinder, the reading and recording head is controlled to perform its recording function and is effective to record on the cleared storage element the amount in the accumulator.

Routing switches are driven in timed relation with the cylinder to cause entry of the read digits to be made in proper orders of the accumulator during the first rotation of the cylinder and to enable the recording of the digits in the various denominations of the accumulator in proper location of the storage element during the second rotation of the cylinder.

Since the eight-denominational-order capacity is provided in the storage of amounts, eight denominational orders are provided in the electronic accumulator. This accumulator is not shown in this application, but is fully described in the parent application, Serial No. 220,473, to which reference may be had for a complete explanation. Each order of the accumulator includes an entry device including a flip-flop circuit, a ring of ten gaseous tetrodes operable step by step in sequence, and a pair of control tubes which are controlled by the ring in read-out operations to control the storage of an amount standing in the ring at that time. Tens transfer means interconnects the various orders of the accumulator.

If desired, an indicator in the form of a glow lamp for each of the tubes of the rings may be associated with the accumulator. The lamps corresponding to the tubes which are conducting in the several rings will glow and provide a visible indication of the amount standing in the accumulator at any stage of its operation.

Also associated with each ring of the accumulator is a manually-operable amount entry control switch which can be set according to the new amount to be combined with the stored amount. The switch for each ring has two parts, one part which is rendered operable to cause the tube corresponding to the setting of the switch to be fired when the new amount is to be added to the stored amount, and another part which is rendered operable to cause the tube corresponding to the "nines" complement of the setting of the switch to be fired when the new amount is to be subtracted from the stored amount.

An "Add-Subtract" switch is provided to select which sections of the manually-operable amount entry control switches will control the accumulator, and an "On-Off" switch and associated controls are provided which when operated to "On" will cause operating potential to be supplied to the accumulator to render the accumulator operable and will cause the manually-operable switches to be momentarily effective to preset the accumulator according to their setting or the complement of their setting as controlled by the "Add-Subtract" switch. When the "On-Off" switch is set to its "Off" position, it will remove operating potential from the ring and thereby clear the accumulator for another problem. The above switches are not shown in this application, but are fully described in the parent application, Serial No. 220,473, to which reference may be had for a complete explanation.

In order to read out amounts from the accumulator and store these amounts on proper denominational portions of the storage elements, an impulse-generating means is provided for generating read-out impulses. This means is operated in synchronism with the rotation of the cylinder, and ten impulses are sent to each denominational order of the accumulator in sequence as the related denominational portion of the storage element is passing the reading and recording head, and these impulses will cause the rings of tubes to be operated in succession, driving the tubes in each ring from any setting, completely around the ring, and restoring the ring to the setting which it had before the ten impulses were applied thereto. During this operation of the ring, when the "0" tube operates, it will cause the pair of control tubes related to that ring to become effective and enable the further impulses, which are applied to the ring after the "0" tube operates, to be sent to the reading and recording head, which operates at this time as a recording head to apply a corresponding number of spots to the proper portion of the storage element. During this read-out operation, the tens transfer means is disabled to prevent unwanted tens transfers which would occur as the rings were driven through zero to render the control tubes effective.

The manner in which the apparatus is operated is as follows. Before the cylinder is set in operation, the manually-operable amount entry control switches are set according to the new amount, the "Add-Subtract" switch is set according to whether the new amount is to be added or subtracted, and then the "On-Off" switch is set to "On." The operation of the "On-Off" switch causes operating potential to be supplied to the accumulator and causes the manually-operable amount entry control switches to be made effective momentarily to cause the tubes of the rings corresponding to the amount, or its complement, as the case may be, to become conducting, thereby introducing this value into the accumulator. Also the reading and recording head and the erasing head are placed in cooperative relation with the storage element on which the amount to be combined with the new amount has been stored.

The driving means for the cylinder is then rendered operative to drive the cylinder through two rotations. During the first rotation of the cylinder, each of the magnetic spots making up the digits of the stored amount will generate an impulse in the reading and recording head, which impulses are amplified and are routed to the proper denominational orders of the accumulator to cause the step-by-step operation of the tubes of the rings therein to add the stored amount to the preset amount. The erasing head is effective in the first rotation to erase the stored amount after it has been read from the storage element. At the end of the first rotation of the cylinder, the stored amount has been read therefrom and has been combined with the amount which was preset in the accumulator.

The second rotation of the cylinder immediately follows the first. In the second rotation, the read-out impulse generating means sends a group of ten read-out impulses to each of the orders of the accumulator in sequence and in timed relation with the passage of the storage element past the reading and recording head, which head is now controlled as a recording means. As each denominational portion of the storage element passes the recording head, the group of impulses will be sent to the corresponding denomination of the accumulator to cause the ring of that denomination to operate from the digit-representing condition in which the ring stands, through zero, and back to the starting digit-representing condition. When the "0" tube in the ring operates, it causes the related control tubes to become effective to pass the remaining impulses of the group to the recording head to cause a corresponding number of magnetic spots to be recorded on that portion of the storage element. Accordingly, as successive portions of the storage element pass the recording head and the groups of impulses are sent to the corresponding denominations of the accumulator, the required number of magnetic spots will be recorded on each portion according to the digit registered in the related denomination of the accumulator, thereby storing on the storage element the amount standing on the accumulator.

The drive for the cylinder is interrupted when the cylinder completes its second rotation.

At the end of the operation of the cylinder, the "On-Off" switch operated to "Off" position to remove operating potential from the accumulator to clear it of the amount standing thereon and prepare it for a further presetting operation.

Variations on the above mode of operation will enable the amount stored on any storage element to be ascertained and will also enable the amount to be cleared from the storage element.

For instance, when it is desired to ascertain the amount which is stored on any storage element, zeros are preset in the accumulator under control of the manually operable amount entry control switches, and the cylinder is cycled to read out the stored amount and enter it in the accumulator. At the end of the first rotation of the cylinder, the stored number will be standing on the accumulator and can be read by observing the indicating glow lamps. In the second rotation of the cylinder, the amount in the accumulator is again stored on the element, thereby returning to the storage element the amount which was read therefrom in the first rotation of the cylinder. The amount is still retained in the accumulator at the end of this second rotation and can again be ascertained by reading the glow lamps. The amount will remain in the accumulator until the accumulator is cleared in an accumulator-clearing operation.

In order to clear an amount from a storage element, the cylinder is cycled without potential having been applied to the accumulator. Under these conditions, the impulses which are generated during the reading of the amount will be ineffective on the accumulator, so that during the second rotation of the cylinder none of the read-out impulses will be effective to record amounts, thereby leaving the element, which was cleared during the first rotation, in its cleared condition.

*Detailed Description*

The amount storage cylinder 15 (FIG. 1 and 3) is secured to a shaft 16, which is rotatably supported by side frames 17 and 18, suitably secured to a base member 19.

The construction of the cylinder 15 and the storage elements thereon will now be explained with reference to FIGS. 2, 3, 9, 10, and 11. The cylinder 15 is made of non-magnetic material and has formed therein a plurality of parallel circumferential grooves 20. Each of the grooves is flanked by a pair of slanting guide surfaces 21 and 22 (FIG. 2) for guiding the various heads in their relation with the storage elements. Amount storage elements, as 23, consist of bands of magnetic material which lie in the grooves 20 and extend circumferentially about the cylinder. FIG. 11 includes a diagrammatic representation of one of the amount storage elements 23 and shows how different portions of the element about the cylinder are assigned to receive digit entries in the eight denominations in succession, as shown by the portions opposite the angle "a" through "h," the digit entry in each denominational order being in the form of a plurality of discrete magnetized spots or marks corresponding in number to the digit which is stored. The digit "nine" would be stored by a spot in each of the locations indicated on the element, the digit "eight" would be stored by a spot in each of the locations "8" through "1" as indicated, etc., with the digit "one" being stored by a spot in the location indicated by "1." As the cylinder is rotated, the various denominational portions of the element will move past a reading and recording point in succession, so that stored amounts can be read or amounts can be stored on the element.

The storage elements 23 and the means for securing them on the cylinder may take various forms. In the preferred embodiment of the invention, the several storage elements on the cylinder are formed from wire of copper-nickel-iron alloy sold by General Electric Company under the trade name "Cunife." In order to readily provide the plurality of storage elements and to secure them in the grooves on the cylinder, the preferred embodiment of the invention utilizes a single piece of wire to form the plurality of elements, which wire need not be secured to the cylinder for each element, but only the two ends of the wire need be secured to the cylinder to secure all the elements in place. The manner in which the plurality of storage elements can be formed from a single piece of wire is shown in the enlarged portions of the cylinder in FIGS. 9 and 10. The cylinder 15 is formed with a slot 25 along its length, which slot communicates with a cylindrical opening 26. One end of the wire then extends from one side of the slot 25, around the cylinder in the first groove 20. After the wire is carried about the cylinder to form one storage element 23 and is adjacent the other side of the slot 25, it is bent over in the slot 25, as shown at 28 in FIG. 9, and is guided into the next adjacent groove 20 and about the cylinder to form another storage element 23. This process is continued until all the storage elements have been formed on the cylinder; then the other end of the wire is secured by a plug inserted in the other end of the opening 26. The slot 25 and the cylindrical opening 26 aid in the off-setting of the single wire, so that it can be placed in the plurality of parallel circumferential grooves 20 to form the plurality of storage elements 23.

It is to be noted that the upper fifth of the storage element 23, that part subtended by angles "x" and "y," as shown in FIG. 11, is not used to store amounts, and it is in this portion of the element that the cross-over 28 is made.

As a matter of convenience, the storage element which is the right-most element on the cylinder 15, as seen in FIG. 3, is used as an element 29 of the read-out impulse generating means. The storage element 29, as shown in FIG. 11, has recorded thereon ten magnetic spots in each of the portions corresponding to the eight denominational portions of the amount storage elements, and these spots are used to generate groups of ten impulses to be sent to the various denominational orders of the accumulator during a read-out impulse generating operation in which the amount on the accumulator is being read therefrom and stored on a storage element. These spots are not erased in the operation of the apparatus but are used over and over in a plurality of amount-storing operations, in a manner which is fully explained in the previously-mentioned parent application, Serial No. 220,473.

A plurality of electromagnetic reading and recording heads are associated with the storage elements. These heads are of similar construction, being provided with a magnetic circuit which includes two pole pieces (FIG. 4), as 35 and 36, spaced apart to provide a small air gap at one end and coupled by a bar at their other end. Coils, as 37 and 38, are mounted on the pole pieces and can be connected in aiding series relation and to external circuits which control whether the head is to function as a reading head, a recording head, or an erasing head. The magnetic circuit and coils of the head are enclosed in a suitable protecting cover 39, from which the pole pieces as 35 and 36 extend.

When the head is to function as a reading head, the coils are controlled so that a voltage will be induced in the coils as each magnetic spot on the storage element moves past the pole pieces, and these induced voltages can be utilized as impulses to operate the accumulator, thereby enabling the amount on the storage element to be read therefrom and entered in the accumulator in a manner to be explained more fully hereinafter.

When the head is to be used as an amount-recording head, impulses are applied to the coils of such a polarity that they will produce a magnetic field sufficient to produce discernible magnetic spots on the storage element. When the head is to be used as an erasing head, it will be supplied with a direct current to produce a magnetic field of proper polarity and strength to overcome the magnetic spots which might be on the storage element.

Three heads are provided in the disclosed apparatus. These are (1) a read-out impulse generating means reading head 45, which cooperates with a storage element 29 to enable the magnetic spots thereon to generate read-out impulses as the cylinder rotates; (2) a reading and recording head 46, which can cooperate with any selected amount storage element to read the stored amount therefrom in the first rotation of the cylinder 15 and to store an amount on the element during the second rotation of the cylinder; and (3) an erasing head 47, which also cooperates with the selected amount storage element and is controlled to erase a stored amount after it has been read by the head 46 in the first rotation of the cylinder.

The head 45 is mounted on a guide element 48, and the reading and recording head 46 and the erasing head 47 are mounted on a guide element 49. As seen most clearly from FIG. 1, the erasing head 47 is displaced from the reading and recording head 46 a slight distance clockwise about the cylinder.

While in the instant embodiment the erasing head is displaced clockwise about the cylinder in relation to the reading and recording head in order to erase a stored amount during the first rotation of the cylinder after the amount has been read, it will be obvious that the erasing head could also be displaced counter-clockwise about the cylinder relative to the reading and recording head and be rendered effective during the second rotation of the cylinder to erase the stored amount just before the new amount is recorded thereon.

The guide element 48 is secured to arms 50 and 51 (FIG. 3), and the guide element 49 is secured to arms 52 and 53, which arms are provided with hubs by which they are pivotally supported on a rod 54, carried by extensions 55 and 56, secured, respectively, to the side frames 17 and 18. The arms 50 and 51 are held against lateral movement on the rod 54 to maintain the pole pieces of the head 45 in alinement with the storage element 29 of the read-out impulse generating means. The arms 52 and 53 are slidable longitudinally of the rod 54 to enable the heads 46 and 47 on the guide element 49 to be associated with any of the amount storage elements 23.

Figure 2:
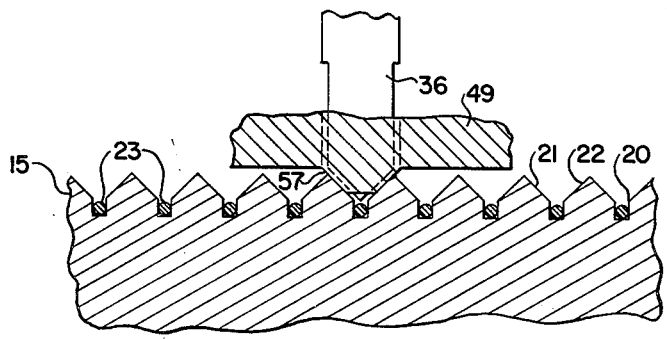
FIG. 2 is a section of a portion of a pole-piece of a magnetic reading and recording head and a section of a portion of a cylinder upon which amounts are stored, showing the cooperation between the head and the storage elements on the cylinder.

The guide elements 48 and 49 have arcuate cylinder-engaging surfaces, as shown in FIGS. 1, 2, and 3, from which extend a pair of lugs, as 57, which are in alinement with the pole pieces 35 and 36 and engage the guide surfaces 21 and 22 adjacent the selected storage element. The lugs 57 not only maintain the pole pieces in alinement with the selected storage element but also control the length of the air-gaps between the pole pieces and the storage element.

The driving means for rotating the cylinder includes a constantly-running motor 65 mounted on the base member 19 and connected through suitable reduction gearing 66 and gears 67 and 68 to the driving gear 69 of a clutch which is rotatably mounted on a stud 70 on the frame 17. Secured to the gear 69 is a driving ratchet 71, which can be engaged by a spring-urged pawl 72 on a plate 73 of the driven portion of the clutch. The driven portion of the clutch also includes a homing cam 74 and a gear 75, which meshes with a gear 76 secured to the shaft 16, on which the cylinder 15 is mounted. The ratio between the gears 75 and 76 is such that the cylinder 15 will make two rotations for each rotation of the driven portion of the clutch.

It is necessary that the cylinder have substantially uniform motion during the time the arc which subtend the angles "a" through "h" are passing the reading and recording head. If, due to the inertia of the cylinder or other causes, there is hunting action during the rotation of the cylinder, so that the movement of the cylinder is not uniform when these arcs pass the head, a slight amount of friction applied to the shaft 16 by means of a brake or other equivalent arrangement will reduce the hunting and make the motion sufficiently uniform for proper sensing and recording operations.

A clutch trip lever including arms 81 and 86 is pivotally supported on a stud 80 on the frame 17 and is urged by a spring into its normal position, where one arm 81 thereof can engage the pawl 72, which is normally urged to engage the ratchet 71, and hold it out of engagement with the ratchet in the home position of the clutch. A cam follower 82, carried by an arm mounted on a stud 83 in the frame 17, is urged by a spring 84 to engage the homing cam 74 to assist in locating the driven portion of the clutch in home position.

A stud 85 on the arm 86 of the trip lever extends through a slot in the side frame 17 and enables the lever to be rocked to move the arm 81 out of engagement with the pawl to render the drive for the cylinder effective. This stud 85, through its cooperation with the slot in the frame 17, also controls the extent of movement of the trip lever.

In order to be able to stop the cylinder after its first rotation, for testing or other purposes, a second trip lever 90 is provided to uncouple the clutch after it has made one half of a rotation. This trip lever is pivoted on a stud 91 on the frame 17 and is spring-urged into position to disengage the pawl 72 from the ratchet 71. The trip lever 90 is normally held in its ineffective position, as shown in FIG. 1, by a stud 92, which extends through an opening in the frame 17. However, when the stud 92 has been removed, the spring will move the lever 90 to its operative position, in which it can uncouple the pawl 72 from the ratchet after the clutch has made one half of a rotation. A formation on the homing cam 74 cooperates with the cam follower 82 to locate the driven portion of the clutch in this mid-position when it has been disconnected from the driving ratchet 71 by the engagement of the pawl 72 by the lever 90. The clutch, which has been thus disconnected, can be rendered operable to complete its second half-rotation and return to its home position, by operating a stud 93 on the lever to move the trip lever out of operative engagement with the pawl in the same manner in which the clutch was rendered operable by the operation of the stud 85.

The shaft 16 extends through the side frame 18 and has secured thereto the rotors of two routing switches RS-1 and RS-2 (FIG. 3), mounted on suitable mounting posts, as 94, and drives a non-bridging wiping contact of each switch past its related stationary contacts once for each rotation of the cylinder. Switch RS-1 is operable during both rotations of the cylinder. In the first rotation, it routes the digits of the stored number to proper orders of the accumulator as they are read, and in the second rotation it routes the groups of impulses from the read-out impulse generating means to the various orders of the accumulator. Switch RS-2 is effective during the second rotation of the cylinder to route impulses from the various denominations of the accumulator during the read-out operation and enables an amount which has been accumulated in the accumulator during the first rotation of the cylinder to be recorded and stored in proper location on the storage element during the second rotation of the cylinder. Front and rear views of one of the switches are shown in FIGS. 5 and 6, and a view of the rotor having a non-bridging wiper contact is shown in FIG. 7.

A plurality of control switches CS-1, CS-2, CS-3, and CS-4 are also operated in timed relation with the rotation of the cylinder 15. These switches are similar to the type shown in FIGS. 5 and 6 but have a bridging wiper contact on their rotors, as shown in FIG. 8. The stators of the switches CS–1, CS–2, CS–3, and CS–4 are mounted on posts 95 and 96, extending from the frame 18, and the rotors are driven by a shaft 97, which is rotatably mounted in the side frames 17 and 18 and is driven by a gear 98, which meshes with the gear 75 on the driven portion of the clutch. The ratio between the gears 98 and 75 is such that the shaft 97 will make one rotation for each rotation of the clutch, so that the wiper contacts of these switches will traverse the stationary contacts once for each two rotations of the cylinder 15. These control switches serve to control the functioning of various parts of the apparatus during the operations of the cylinder, as is fully described in the previously-mentioned parent application, Serial No. 220,473.

While the form of the invention herein illustrated and described is admirably adapted to fulfill the objects primarily stated, it is to be understood that it is not intended to confine the invention to the one form or embodiment herein disclosed, for it is susceptible of embodiment in various other forms.

What is claimed is:

1. In an apparatus of the class described, the combination of an elongate storage element of magnetizable material on which data may be stored in the form of distinctive magnetization; means to drive the element in the direction of its length through two continuous cycles of operation; means cooperable with the element and rendered operable during the first cycle of operation thereof to read stored data: erasing means cooperable with the element and rendered operable during said first cycle of operation to erase stored data after it has been read, thereby to clear the storage element; and recording means cooperable with the element and operable during the second cycle to magnetize the cleared element to store data thereon.

2. In an apparatus of the class described, the combination of an elongate storage element of magnetizable material on which data may be stored in the form of distinctive magnetization; means to drive the element in the direction of its length through two continuous cycles of operation; means cooperable with the element and rendered operable during the first cycle of operation thereof to read stored data; recording means cooperable with the element and operable during the second cycle to magnetize the storage element to store data thereon; and erasing means cooperable with the element to clear the element after data has been read therefrom by the reading means and before the recording means becomes operable to record data on the element.

3. In an apparatus of the class described, the combination of an elongate storage element of magnetizable material on which data may be stored in the form of distinctive magnetization; means including a clutch mechanism to drive the element in the direction of its length through two continuous cycles of operation; means cooperable with the element and rendered operable during the first cycle of operation thereof to read stored data; recording means cooperable with the element and operable during the second cycle to magnetize the storage element to store data thereon; erasing means cooperable with the element to clear the element after data has been read therefrom by the reading means and before the recording means becomes operable to record data on the element; and operating means capable of disengaging the clutch mechanism to terminate driving of the element after one cycle of operation.

4. In a device of the class described, the combination of a cylinder of non-magnetic material having a plurality of circumferential grooves in its outer surface in parallel planes spaced longitudinally of the cylinder and having a cross-over slot running longitudinally of the cylinder and intersecting the grooves; a plurality of storage elements, each element extending about the cylinder and being capable of storing the digits of a multi-digit amount in denominational sequence along its length about the cylinder, said plurality of elements being formed from a single piece of wire-like magnetic material which, starting at one end of the cylinder, extends about the cylinder in the endmost groove to form one element, then crosses over in the slot to the next adjacent groove and extends about the cylinder in the next groove to form another element and so on until storage elements occupy all the grooves; means for securing the ends of the single piece of wire-like material at opposite ends of the cylinder; a magnetic head; means supporting the head for movement longitudinally of the cylinder into alignment with any of said grooves to place said head into cooperative relation with any desired one of the storage elements formed from said single piece of wire-like magnetic material; and means to rotate the cylinder to move the selected storage element past the head.

5. In a device of the class described, the combination of a cylinder of non-magnetic material having a plurality of circumferential grooves in its outer surface spaced longitudinally of the cylinder; a storage element of magnetic material located in each groove, each of said elements being magnetizable selectively along its length about the cylinder to store data; first magnetic means for sensing, erasing and recording data on selected storage elements; indexing means for positioning the first magnetic means in cooperative relation with a desired storage element; second magnetic means positioned in fixed relation to a given storage element to generate impulses used during recording on selected storage elements; and means to rotate the cylinder to move the storage elements past the first and second magnetic means.

References Cited in the file of this patent

UNITED STATES PATENTS

| | | |
|---|---|---|
| 2,144,844 | Hickman | Jan. 24, 1939 |
| 2,509,012 | Morrison | May 23, 1950 |
| 2,614,169 | Cohen et al. | Oct. 11, 1952 |
| 2,617,705 | Coombs et al. | Nov. 11, 1952 |
| 2,652,196 | Sterling | Sept. 15, 1953 |
| 2,770,797 | Hamilton et al. | Nov. 13, 1956 |
| 2,886,398 | Rockwell | May 12, 1959 |

FOREIGN PATENTS

| | | |
|---|---|---|
| 799,945 | Great Britain | Aug. 13, 1958 |